HIGH EFFICIENCY DISCRIMINATOR
Filed Dec. 7, 1962
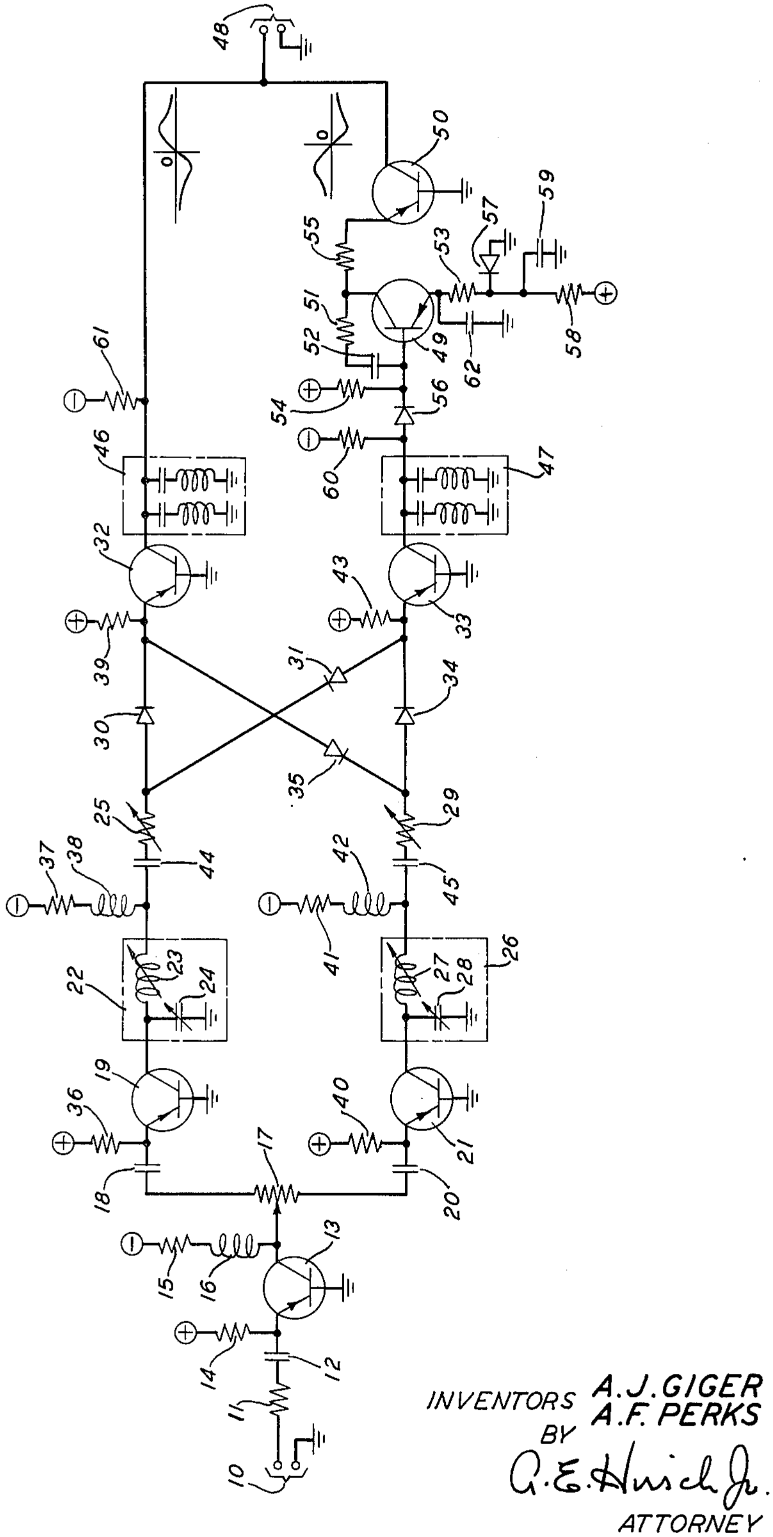
INVENTORS A.J. GIGER
A.F. PERKS
BY
G. E. Hirsch Jr.
ATTORNEY

United States Patent Office 3,248,659
Patented Apr. 26, 1966

3,248,659
HIGH EFFICIENCY DISCRIMINATOR

Adolph J. Giger, Murray Hill, and Arthur F. Perks, Warren Township, Somerset County, N.J., assignors to Bell Telephone Laboratories, Incorporated, New York, N.Y., a corporation of New York Filed Dec. 7, 1962, Ser. No. 243,157
5 Claims. (Cl. 329—133)

This invention relates to circuits which are responsive to frequency variations and more particularly to frequency discriminators.

One of the principal concerns in the design of long range communication systems involves the recovery of modulated signals of relatively low level from a relatively high level of background noise. This noise may result from sources either external to or within the receiver apparatus. The problem is of paramount importance, for example, in over the horizon communication systems, in systems employing space satellites as terminal or repeater stations, and in any other broad-band, high frequency systems in which the power available in the modulated signal supplied to the receiver is of a very low order of magnitude. It is well known, of course, that the detection threshold of a receiver used in such a system may be appreciably improved by using high-index frequency modulation and recovering signal information with a discriminator circuit which employs feedback. This form of demodulator was disclosed by J. G. Chaffee in Patent 2,075,503, granted March 30, 1937. Nothwithstanding the increase in signal-to-noise ratio of the demodulated signal obtained with a detector of this form, signal delays in the circuits which make up the detector often limit the bandwidth which can be accommodated by the circuit. Circuits used in the demodulation process, therefore, should exhibit as much signal gain with as little signal delay, or phase shift, as possible.

It is, therefore, the principal object of this invention to improve the demodulation sensitivity of a frequency modulator detector circuit. It is another object of the invention to increase the signal output of an FM discriminator over a broad band of frequencies and to minimize the signal delay, or phase shift, imparted to signals passed therethrough.

In general, frequency discriminators recover modulated signal information, e.g., the baseband signal, from an FM carrier in two steps. First, an input frequency modulated carrier signal is converted to an amplitude modulated carrier signal by virtue of one or more frequency sensitive networks. Preferably two such circuits are employed, one tuned to a frequency above the intermediate carrier frequency and the other to a corresponding point below. One network prouces amplitude modulation proportional to frequency deviation of the carrier above its normal, unmodulated frequency, and the other produces amplitude modulation proportional to frequency deviation of the carrier below its unmodulated frequency. Secondly, amplitude detectors recover the baseband signal from each amplitude modulated signal. A diode poled in one direction is used in one channel, and a diode poled in the opposite direction is used in the other.

At carrier frequency, equal and opposite voltages or currents are produced since the amplitudes of signals in both branches are equal. The net output is thus zero. With frequency deviation in either direction, the amplitude of signals in one channel is greater than in the other, and a net output proportional to the magnitude of the difference is produced. With a symmetrical configuration of rectifiers employed in a discriminator of this sort, i.e., a two-channel discriminator, the rectifiers are biased to exhibit a low impedance to the supplied carrier signals over that half of the cycle during which they conduct, and a high impedance over that half cycle during which they do not.

The diodes generally operate as peak detectors by virtue of associated reactance networks which shunt the carrier signal to ground. In large measure, these networks determine the rectification efficiency of the detector circuit. Moreover, they load the supply circuit, e.g., the IF circuit preceding the discriminator, and may delay the demodulated signal. It is very difficult to optimize the detection process with such a circuit configuration and, in the case of a discriminator operating at bandwidths of several tens of megacycles per second, becomes even more difficult because of the very low impedances required.

It is still another object of the present invention to separate the individual functions of a discriminator circuit so that each can be individually adjusted and made to operate optimally.

A considerable improvement can be obtained by delivering rectified signals from the diodes to a very low impedance load, as for instance the emitter to base junction of a grounded base transistor. The impedance loading caused by such a connection will not be constant, but will change from low to very high over one cycle. In order to avoid such impedance variations, diodes of opposite polarities can be connected to ground on the IF sides (input sides) of the amplitude detectors. The shunt diodes provide a low impedance to the IF circuit over that half of each cycle during which the detector diodes are not conducting. They also serve to establish reasonably good independence between the detection circuit and the IF circuit. Detection takes place with high efficiency so long as sufficiently fast acting diodes are used, and essentially no signal delay is caused by the transistor circuit following the diodes. IF suppression filters can be connected to the output of the transistors which cause only little delay to the demodulated signal. Although currents through the shunt diodes are not needed from an information point of view, their loss represents a significant loss of carrier signal energy.

It is a further object of the invention to improve the efficiency of a two-channel frequency discriminator by recovering signal information from both half cycles of the modulated carrier signal.

In accordance with the present invention, frequency modulated carrier signal currents are supplied individually to a pair of frequency sensitive networks. To maintain the widest possible bandwith characteristic and the lowest signal delay, transistor circuits in the grounded base configuration are employed to generate the currents for each channel from applied IF signals. Each network introduces an amplitude slope across the carrier frequency band which produces amplitude modulation variations proportional to frequency deviation, above and below respectively, the center carrier frequency. Linear rectifiers in each channel detect the amplitude variations in one-half of each carrier cycle, e.g., positive half cycles, and impress the resulting current variations, individually, on the emitters of transistor amplifiers operating in the grounded base configuration. The transistor amplifiers act as impedance buffers and, because of their very low impedances, cause very little delay of the rectified signals. The remaining current half cycles of information recovered in each channel, e.g., the negative half cycles, are also used since they contain signal information and carrier signal energy. These signals are, in accordance with the invention, detected by a second pair of linear rectifiers and supplied as currents to the emitters of the buffer transistor amplifiers in the opposite channels. In effect, the positive half cycles of signal information from the tuned network in one channel are delivered to a first output point together with the negative half cycles of signal information from the tuned network in the other channel. Similarly, the positive half cycles of signal information from the tuned network in the second channel are supplied to a second output point together with negative half cycles of signal information from the tuned network in the first channel. A connection of this sort may be visualized as a bridge circuit in which signals developed by the frequency sensitive networks are supplied to the diagonally opposite junction points of the arms of the bridge, respectively, and detected signals, positive half cycles of information from one channel and negative half cycles of information from the other, are removed individually from the remaining diagonal terminals of the bridge. By this expedient, signal energy from both half cycles of signals from each of the tuned networks is recovered.

The interconnection of the two normally independent channels does not change the operation of the demodulator, the IF circuits, or of the impedance buffers. The impedance, signal delay, and loading of the IF circuit preceding the demodulator, and the buffer following it, remains essentially the same. Yet the cross-connection yields an appreciable increase in usable output since more rectified current is supplied to the output. In practice, the sensitivity of a discriminator constructed in accordance with the principles of the invention, is increased by a factor of approximately two.

For a balanced output, the currents from the collectors of the buffer amplifiers are passed through filters, which remove high frequency information, and supplied to a balanced load. For an unbalanced output, it is in accordance with the present invention to invert the phase of signals from one of the filters and to add them to those from the other filter.

These and other objects and features of the invention, its nature and its advantages, will appear more fully upon consideration of the illustrative embodiment shown in the accompanying drawing and the following detailed description.

In the FM demodulator circuit shown in the drawing, a frequency modulated signal supplied, for example, from an IF amplifier or a suitable amplitude limiting circuit, is applied to terminals 10. From the terminals it is passed by way of matching resistor 11 and coupling capacitor 12 to the emitter of grounded base, transistor buffer amplifier 13. Amplifier 13 is suitably biased by a positive potential supplied by way of resistor 14 to the emitter terminal and by a negative potential supplied by way of resistor 15 and inductor (choke) 16 to the collector terminal. A high frequency transistor should be used for buffer amplifier 13 so that very little delay will be encountered by the FM signals passing through it. The IF current developed at the collector of buffer amplifier 13 is divided into two parts. One part is supplied by way of coupling capacitor 18 to the emitter of transistor amplifier 19 and the other part by way of coupling capacitor 20 to the emitter of transistor amplifier 21. Under normal operating conditions, the two emitter currents are adjusted to be about inversely proportional to the Q's of circuits 22 and 26. If necessary, the wiper arm of potentiometer 17 may be adjusted to achieve the desired signal division. The impedance of potentiometer 17 is selected to be greater than the emitter-to-base resistance of transistors 19 or 21, but still small enough to make the interstage bandwidth much higher than the carrier frequency of the FM signal. The bandwidth of the amplifiers is largely dependent on the collector capacity of buffer amplifier 13 and the resistance of potentiometer 17. By utilizing the grounded base configuration for amplifiers 19 and 21 there is very little delay imparted to the FM signals passing therethrough.

The collector current of transistor 19 is passed through a simple resonant circuit 22 which may typically include an adjustable series inductor 23 and an adjustable shunt capacitor 24. Resistor 25 damps the resonant circuit.

Similarly, currents developed at the collector of transistor stage 21 are supplied to a resonant circuit 26 which includes, typically, adjustable series inductor 27 and adjustable shunt capacitor 28; the network is damped by resistor 29. The upper circuit is closed to ground by way of diodes 30 and 31 and the emitter-to-base junctions of transistors 32 and 33, respectively. The effect of the diodes and the transistors on the resonant circuit 22 is merely to add some additional resistance to resistor 25 and some inductance to inductor 23. The circuit is tuned by means of capacitor 24 and inductor 23 to a frequency higher than the carrier frequency of the FM signal and the Q of the circuit is adjusted by the proper adjustment of resistor 25. In a typical discriminator used in practice in which the center carrier frequency is 74 megacycles per second, the network 22 is tuned 11 megacycles higher than the carrier to a frequency of 85 megacycles. The current flowing through resistor 25 is Q times the current delivered by the collector of transistor 19. Diodes 30 and 31 rectify this IF current and deliver it to the emitters of transistors 32 and 33 in the form of positive and negative half sine wave pulses, respectively. Transistors 32 and 33 act as impedance buffers and cause very little delay to the rectified signals. They also pass, of course, the high instantaneous current peaks of the half sine wave pulses, that is, they pass the IF carrier and its several harmonics.

Quite analogous to the high frequency discriminator channel of the upper circuit, the filter network 26 in the lower circuit is tuned to a frequency lower than the carrier of the FM signal. For the example of a 74 megacycle carrier, the network is tuned 11 megacycles below it at 63 megacycles. As before, inductor 27, capacitor 28, and resistor 29 are adjusted as required. Diodes 34 and 35 rectify IF currents passed by way of filter 26 and damping resistor 29 and deliver them to the emitters of transistor buffer amplifiers 33 and 32 in the form of positive and negative half sine wave pulses, respectively.

Following conventional two-circuit discriminator design, the Q's and the detuning of the high and low frequency circuits are chosen such that, at the carrier frequency of the FM signal, the two circuits 22 and 26 are operated at the 3 db down points. Amplifiers 19 and 32 in the upper channel and 21 and 33 in the lower channel may be biased to the proper operating points using standard techniques. For example, the emitter of amplifier 19 may be biased from a positive potential point by means of resistor 36 and its collector may be biased from a suitable negative potential source by way of resistor 37 and choke 38. The emitter of amplifier 32 is suitably biased from a positive potential source via resistor 39 and its collector from a negative source via resistor 61. In the lower channel, the emitter of amplifier 21 is biased positively by way of resistor 40 and its collector negatively from a negative source by way of resistor 41 and choke 42. The emitter of amplifier 33 is positively biased by way of resistor 43, and its collector negatively by way of resistor 60. D.C. isolation in the two circuits may be provided by means of capacitors 44 and 45, respectively.

In the ordinary two-channel discriminator, a single diode in each channel is operated as a peak detector by virtue of associated RC networks in shunt with the signal paths. The networks operate to shunt the IF signal to ground but, unfortunately, load the IF circuit and delay the demodulated signal. They are largely responsible for the rectification efficiency of the detector channels. Consequently, it is very difficult to optimize the detection process under such circumstances, especially in the case of a demodulator wherein the circuit impedances must be kept very low in order to assure a wide bandwidth and low signal delay.

This difficulty is avoided in the present invention by isolating the necessary shunt filtering action from the diode detectors and from the IF supply source. Thus, the emitter-to-base impedance of buffer amplifiers 32 and 33 is extremely low and varies only slightly over each cycle. Essentially no signal delay is caused by the buffer amplifier circuits. Harmonic filters 46 and 47 are connected in the collector circuits of buffer amplifiers 32 and 33, respectively. These may be of any desired construction and are used to bypass the high frequency components, i.e., IF carrier and its harmonics, to ground so that only the demodulated FM base band signal is allowed to pass. So long as the IF carrier frequency is considerably higher than the highest base band frequency encountered, no difficulty is experienced in removing completely the high frequency components with simple filters. Further, it is possible using only ordinary techniques to design filters which cause virtually no delay of the demodulated signal. There is another advantage in using a high IF frequency, namely, for a fixed bandwidth of the high tuned filter 22, the Q of the circuit and, in turn, the current gain of the upper channel will increase with IF frequency.

The output of the discriminator is obtained by taking the rectified current developed at the output of harmonic filter 46 and algebraically combining it with the rectified current developed at the output of harmonic filter 47. These signals may be delivered immediately to output terminals 48 if a balanced, or push-pull, base band output signal is desired. If, however, an unbalanced signal is required (i.e., if a single ended discriminator is required, a phase inverting circuit is required in one of the detector branches. Thus, for example, the signal developed at the output of harmonic filter 47 is reversed in phase before it is combined with the signal developed by filter 46 at output terminals 48. The phase reversal is achieved, in accordance with the present invention, by passing the signal through transistor amplifier 49 and transistor follower 50.

This circuit provides unity gain from D.C. to the very high frequencies. The gain of the reversing stage 49 is preferably stabilized by feedback. Accordingly, signal currents developed at the collector of transistor 49 are returned to the base by way of resistor 51 and capacitor 52. The gain at low frequencies, including D.C., is stabilized by making the ratio of the resistance of resistor 53 in the emitter circuit to the combined resistance of the resistors 54 and 60 in parallel (in the base circuit) greater than $(1-a)$ where $a$ represents the common base current gain of transistor amplifier 49. By making the ratio very close to unity, high stability of the reversing stage is assured. At higher frequencies, the gain is approximately equal to the ratio of the resistance of resistors 51 and 55 and is therefore close to unity. Stability is again guaranteed because the ratio of resistances of resistors 55 to 51 is much greater than $(1-a)$. Equal gain at low and high frequencies is provided by making the ratio of resistors 53 to the parallel combination of resistors 54 and 60 equal to the ratio of the resistances of 55 to 51. An important relation between capacitors 52 and 62 must also be maintained for flat transmission, namely:

$$\frac{C62}{C52}=\frac{1}{a}+\frac{1}{a}\cdot\frac{R51}{R55}+\frac{R51}{R53}+\frac{R55}{R53} \qquad (1)$$

By closely adhering to relations of this sort, essentially flat response from low to very high frequencies can be achieved with virtually no signal delay. Zener diodes 56 and 57 are utilized in the base and emitter circuits, respectively, of amplifier 49 to provide suitable D.C. operating voltages for amplifier 49. Other means may, of course, be used. Diode 57 in the emitter circuit of amplifier 49 is suitably biased from a positive potential source by way of resistor 58 and decoupling capacitor 59, and diode 56 in the base circuit of transistor 49 is biased additionally from a negative potential source by way of resistor 60. Follower amplifier 50, connected in the grounded base configuration, couples the phase reversed signal from harmonic filter 47 to output terminal 48.

At the center frequency of the FM signal, the rectified currents from the high and low tuned circuits of the discriminator channels are equal and the D.C. components from rectifiers 30 (high channel) and 35 (low channel) cancel at the emitter of buffer amplifier 32. Similarly, the D.C. components from diodes 34 (low channel) and 31 (high channel) cancel at the emitter of buffer amplifier 33. At frequencies higher than center carrier frequency, more current is delivered through diodes 30 and 31 than is delivered through diodes 34 and 35. Consequently, a positive D.C. current flows into the emitter of transistor 32 and the same but negative current into the emitter of transistor 33. The operating limit of the discriminator is reached at a frequency where the currents through diodes 30 and 31 are about 3 db higher than at center frequency. Transistors 32 and 33 have to handle the maximum instantaneous current excursions corresponding to the frequency limits of the discriminator. A D.C. current bias at least equal to this instantaneous peak current is therefore necessary for transistors 32 and 33. Suitable selection of the biasing potentials and coupling resistors establish the correct operating points.

Similarly, at frequencies below center frequency, a positive D.C. current flows into the emitter of transistor 33 and the same but negative current into the emitter of transistor 32. The output of the discriminator is then obtained by adding the rectified current from the collector of transistor 32 to the phase reversed current from transistor 33 (available at the collector of transistor 50).

It will be evident that the essential operation of the two-channel discriminator is not altered by the presence of diodes 31 and 35, but that the supplementary energy available in the negative half cycles of the carrier signals present in each of the two discriminator channels is captured and utilized to increase appreciably the signal current injected into the emitters of the buffer amplifiers. Further, the buffer amplifiers provide an extremely low impedance load for each of the two discriminator channels. Accordingly, the additional current developed in the emitter-to-base circuit of the buffer amplifiers materially increases the usable signal in the output, without causing additional signal delay. Further, by virtue of the impedance buffers, the harmonic filtering operation is isolated from the diode rectifiers, and hence from the IF signal supply source. Each of the several circuit elements can thus be individually adjusted to provide the highest signal gain with the lowest signal delay.

It will be readily apparent to those skilled in the art that various other circuit configurations may be devised which utilize the principles of the present invention, but which do not depart from its spirit and scope. The particular configuration shown in the drawing, therefore, is merely deemed representative of these principles and the way in which they may be turned to account in improving the sensitivity of a high frequency discriminator circuit with essentially no increase in delay.

What is claimed is:

1. Apparatus for recovering signal intelligence from a frequency modulated current which comprises means for converting frequency variations above the center frequency of the modulated current to amplitude variations, means for converting frequency variations below the center frequency of the modulated current to amplitude variations, means for independently rectifying positive and negative amplitude excursions of signals from both of said conversions, and means for algebraically combining said recovered signals to form a composite output signal.

2. A demodulator for frequency modulation signals which comprises, first network means supplied with a source of modulated carrier current for developing amplitude variations corresponding to frequency variations of said currents above the center carrier frequency, second network means supplied with said source of modulated carrier currents for developing amplitude variations corresponding to frequency variations of said currents below said center carrier frequency, means for independently rectifying positive and negative amplitude excursions of signals developed by said first network means, means for independently rectifying positive and negative amplitude excursions of signals developed by said second network means, independent means for algebraically combining rectified signals from both of said paths, rectified positive amplitude excursions from one of said paths and rectified negative amplitude excursions from the other, and means for differentially utilizing said combined signals as an output signal.

3. A demodulator for frequency modulation signals which comprises, a source of modulated carrier signals, means for supplying said carrier signals to a first circuit tuned to a frequency higher than said carrier signals, means for supplying said carrier signals to a second circuit tuned to a frequency lower than said carrier signals, first and second diode means for rectifying positive and negative half cycles, respectively, of signals passed by said first tuned circuit, third and fourth diode means for rectifying positive and negative half cycles, respectively, of signals passed by said second tuned circuit, first means for adding the rectified positive half cycle signals from said first tuned circuit and the rectified negative half cycle signals from said second tuned circuit, second means for adding the rectified positive half cycle signals from said second tuned circuit and the rectified negative half cycle signals from said first tuned circuit, and means for utilizing the signal developed by said first and said second adding means as an output signal.

4. A demodulator for frequency modulation signals which comprises: a source of modulated carrier signal currents; a load for demodulated signal currents; first and second signal current paths extending from said source to said load; the first of said paths including network means for developing amplitude variations proportional to frequency variations of signal currents above the center frequency of said modulated carrier currents, means for rectifying positive amplitude variations of signal currents in said first path, low impedance means for amplifying rectified positive signals from said first path, and means for removing carrier current variations from signals passed by said amplifier; the second of said paths including network means for developing amplitude variations proportional to frequency variations of signal currents below the center frequency of said modulated carrier currents, means for rectifying positive amplitude variations of signal currents in said second path, low impedance means for amplifying rectified positive signals from said second path, means for removing carrier current variations from signals passed by said amplifier, and means for reversing the phase of signals passed by said carrier removing means; a third signal current path extending from said network means in said first path to said low impedance amplifier means in said second path, said third signal path including means for rectifying negative amplitude variations of currents in said first path; and a fourth signal current path extending from said network means in said second path to said low impedance amplifier means in said first path, said fourth signal path including means for rectifying negative amplitude variations in currents in said second path.

5. Apparatus for increasing the sensitivity of a frequency modulation detector which includes means for individually converting frequency variations above the center frequency of the modulated current and frequency variations below the center frequency of the modulated current to amplitude variations, and means for detecting positive and negative amplitude variations of signals from both of said conversions, which comprise means for utilizing energy from detected positive amplitude variations from the first one of said conversions and detected negative amplitude variations from a second one of said conversions to form a first signal output, and means for utilizing energy from the detected positive amplitude variations from the second one of said conversions and detected negative amplitude variations from the first one of said conversions to form a second signal output, and means for combining said first and said second signal outputs.

References Cited by the Examiner

UNITED STATES PATENTS

| | | | |
|---|---|---|---|
| 2,114,335 | 4/1938 | Crosby -------- | 325—435 XR |
| 2,204,342 | 6/1940 | Crosby --------- | 325—345 XR |
| 2,538,040 | 1/1951 | Prichard ------- | 329—134 XR |
| 3,086,175 | 4/1963 | Barditch et al. --- | 329—134 XR |

ROBERT H. ROSE, *Primary Examiner.*

DAVID G. REDINBAUGH, *Examiner.*

Dedication 3,248,659.—*Adolph J. Giger*, Murray Hill, and *Arthur F. Perks*, Warren Township, Somerset County, N.J. HIGH EFFICIENCY DISCRIMINATOR. Patent dated Apr. 26, 1966. Dedication filed June 5, 1972, by the assignee, *Bell Telephone Laboratories, Incorporated*.

Hereby dedicates to the Public the entire remaining term of said patent.

[*Official Gazette January 2, 1973.*]